US006700259B1

United States Patent
Lin et al.

(10) Patent No.: US 6,700,259 B1
(45) Date of Patent: Mar. 2, 2004

(54) MAGNETIC REPULSION-ACTUATED MAGNETIC BEARING

(75) Inventors: Kang-Ning Lin, Taipei (TW); Fong-Tan Yu, Taipei (TW); Se-Kang Ho, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 57 days.

(21) Appl. No.: 10/368,467

(22) Filed: Feb. 20, 2003

(51) Int. Cl.[7] ................................................ H02K 7/09
(52) U.S. Cl. ...................................................... 310/90.5
(58) Field of Search ........................................ 310/90.5

(56) References Cited

U.S. PATENT DOCUMENTS

| | | | |
|---|---|---|---|
| 5,152,679 A | 10/1992 | Kanemitsu et al. | |
| 5,193,953 A | * 3/1993 | Jesinger | ...................... 409/231 |
| 5,545,937 A | 8/1996 | Dunfield et al. | |
| 6,147,422 A | 11/2000 | Delson et al. | |

* cited by examiner

Primary Examiner—Burton S. Mullins
Assistant Examiner—Iraj A. Mohandesi
(74) Attorney, Agent, or Firm—Rabin & Berdo, P.C.

(57) ABSTRACT

A magnetic repulsion-actuated magnetic bearing is constructed to include a stator, two magnetic repulsion modules mounted inside the stator, a rotor having two annular permanent magnets at the ends corresponding to the two magnetic repulsion modules. A magnetic force of repulsion is produced between equiangularly spaced permanent magnets of the magnetic repulsion modules and the annular permanent magnets of the rotor to keep the rotor radially in position automatically upon power failure. A controller is electrically connected to windings of the magnetic repulsion modules for controlling the current of the windings to change the intensity of magnetic force so as to further control the radial magnetic force of repulsion of the magnetic repulsion actuators, keeping the radial bearing stiffness during rotation of the rotor.

9 Claims, 3 Drawing Sheets

MAGNETIC REPULSION-ACTUATED MAGNETIC BEARING

BACKGROUND OF THE INVENTION

1. Field of the Invention

The present invention relates to a magnetic repulsion-actuated magnetic bearing and, more particularly, to a non-contact type magnetic bearing for use in a rotary mechanism such as a motor, power generator, flywheel mechanism, vacuum pump, chemical pump, or the like.

2. Description of Related Art

Following fast development of semiconductor and liquid crystal display manufacturing apparatus and equipments, high speed rotary mechanisms are desired. In recent years, non-contact type bearings are intensively used in rotary mechanisms for the advantages of low friction, low noise, and low vibration. Following the progress of digital control and power electronic technology, magnetic bearings have become the majority choice among non-contact type bearings. Conventional magnetic bearings include magnetic attraction-actuated magnetic bearings and magnetic repulsion-actuated magnetic bearings. Magnetic repulsion-actuated magnetic bearings are commonly of a passive permanent magnet type. This design is seen in U.S. Pat. Nos. 5,152,679; 5,545,937. There are also magnetic repulsion actuators formed of permanent magnets and electromagnets. This design is seen in U.S. Pat. No. 6,147,422.

However, the conventional magnetic attraction-actuated magnetic bearings or magnetic repulsion-actuated magnetic bearings are still not satisfactory in function. According to conventional designs, a magnetic attraction-actuated magnetic bearing requires a bias current as a reference of control. When without load or external interference, a magnetic attraction-actuated magnetic bearing still consumes much electric energy, and its inherent high inductance resulted from the low leakage magnetic linkage/loop inhibits increasing of rotation speed. The inductance of the magnetic loop of a magnetic repulsion-actuated magnetic bearing is low, however its flux lines dissipate severely, not able to effectively inhibit interference and maintain stiffness.

Therefore, it is desirable to have a magnetic bearing that eliminates the aforesaid problems.

SUMMARY OF THE INVENTION

It is the main object of the present invention to provide a magnetic repulsion-actuated magnetic bearing, which retains radial bearing stiffness upon power failed.

It is another object of the present invention to provide a magnetic repulsion-actuated magnetic bearing, which utilizes a by-pass magnetic loop structure to shape the flux lines distribution, so as to improve the stiffness of the magnetic bearing.

It is still another object of the present invention to provide a magnetic repulsion-actuated magnetic bearing, which provides axial bearing by means of axial offset of magnets.

It is still another object of the present invention to provide a magnetic repulsion-actuated magnetic bearing, which enhances the magnetic force of repulsion by arranging a permanent magnet at the front end of the iron core.

To achieve these and other objects of the present invention, the magnetic repulsion-actuated magnetic bearing is comprised of a stator, at least two magnetic repulsion modules, a rotor, and a controller. The stator has an inside wall defining an axially extended receiving hollow chamber. The magnetic repulsion modules each comprise a plurality of magnetic repulsion actuators equiangularly arranged on the inside wall of the stator. Each magnetic repulsion actuator comprises an iron core having a first end fixedly fastened to the inside wall of the stator and a second end radially extended to the receiving hollow chamber, a permanent magnet located on the second end of the iron core, and a winding wound around the iron core and adapted to produce a magnetic force when electrically connected. The rotor is axially received in the receiving hollow chamber of the stator, comprising at least two annular permanent magnets arranged around the periphery thereof corresponding respectively to the at least two magnetic repulsion modules, each annular permanent magnet defining with the permanent magnet of the magnetic repulsion actuator of the corresponding magnetic repulsion module a working air gap. The polarity of each annular permanent magnet is same as the polarity of the permanent magnet of the magnetic repulsion actuator of the corresponding magnetic repulsion module so that a radial magnetic force of repulsion is produced between each annular permanent magnet of the rotor and the permanent magnet of the magnetic repulsion actuator of the corresponding magnetic repulsion module. The controller is electrically connected to the windings of the at least two magnetic repulsion modules, and adapted to respectively control the current of the windings to change the intensity of magnetic force of the at least two magnetic repulsion modules so as to change the net radial magnetic force of repulsion between the annular permanent magnet of the rotor and the permanent magnet of the magnetic repulsion actuator of the corresponding magnetic repulsion module respectively.

Therefore, when power failed, a radial magnetic force of repulsion is produced between the permanent magnets of the stator and the corresponding annular permanent magnets of the rotor. Because the permanent magnets are arranged at the front ends of the respective iron cores corresponding to one end of the rotor, the force of repulsion between the permanent magnets and the annular permanent magnets is enhanced to keep the rotor in balance automatically when power failed. Therefore, the rotor is maintained floating stably when electric current turned off. On the contrary, when electric current turned on, the controller controls the windings of the equiangularly spaced magnetic repulsion actuators to increase or reduce the magnetic force of the corresponding iron cores respectively, so as to change the radial magnetic force of repulsion of the respective magnetic repulsion actuators. Therefore, when the rotor radially biased toward one side, the controller increases the radial magnetic force of repulsion of the magnetic repulsion actuators at the corresponding side and reduces the radial magnetic force of repulsion of the magnetic repulsion actuators at the opposite side, the position of the rotor is maintained stable, and therefore, the rotor is maintained in stiffness in radial direction during rotation.

Further, each magnetic repulsion module further comprises a pair of annular magnetic poles located at two sides axially. The pair of annular magnetic poles each have the respective outside wall fixedly fastened to the inside wall of the stator, and at least one magnetic pole protrusion inwardly protruded from an inside wall of the annular magnetic pole and aimed at the respective permanent magnet of the corresponding magnetic repulsion actuator. The opposite magnetic pole protrusions of the pair of annular magnetic poles define an opening therebetween for receiving the respective permanent magnet of the corresponding magnetic repulsion actuator without contact. Therefore, a by-pass loop is formed between the annular magnetic poles and the permanent magnets to cause a change of the flux lines distribution around the actuators fringe from free diversion, forming an integral loop, and hence provides higher current efficiency and bearing stiffness. The present invention also could use a pair of annular magnetic paths arranged around the periphery of the rotor and spaced from the corresponding annular permanent magnet of the rotor at two sides axially by a gap to form a by-pass loop to achieve the object aforementioned.

The magnetic repulsion-actuated magnetic bearing can be designed having two annular permanent magnets and two magnetic repulsion modules. The two annular permanent magnets are axially spaced around the inside wall of the stator at two ends and respectively aimed at the permanent magnets. The annular permanent magnets are reversed in polarity. The two magnetic repulsion modules and the two annular permanent magnets are arranged in an axial offset manner. The axial distance between the two annular permanent magnets is slightly greater than the axial distance between the two magnetic repulsion modules. The axial offset arrangement of the two magnetic repulsion modules and the two annular permanent magnets achieves balancing in axial direction, i.e., a magnetic force of repulsion is produced at one side to push the rotor in one direction, and a magnetic force of repulsion is produced at the other side to push the rotor in the reversed direction, keeping the rotor in stiffness in axial direction. Same effect can be achieved when the axial distance between the two annular permanent magnets set shorter than the axial distance between the two magnetic repulsion modules.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
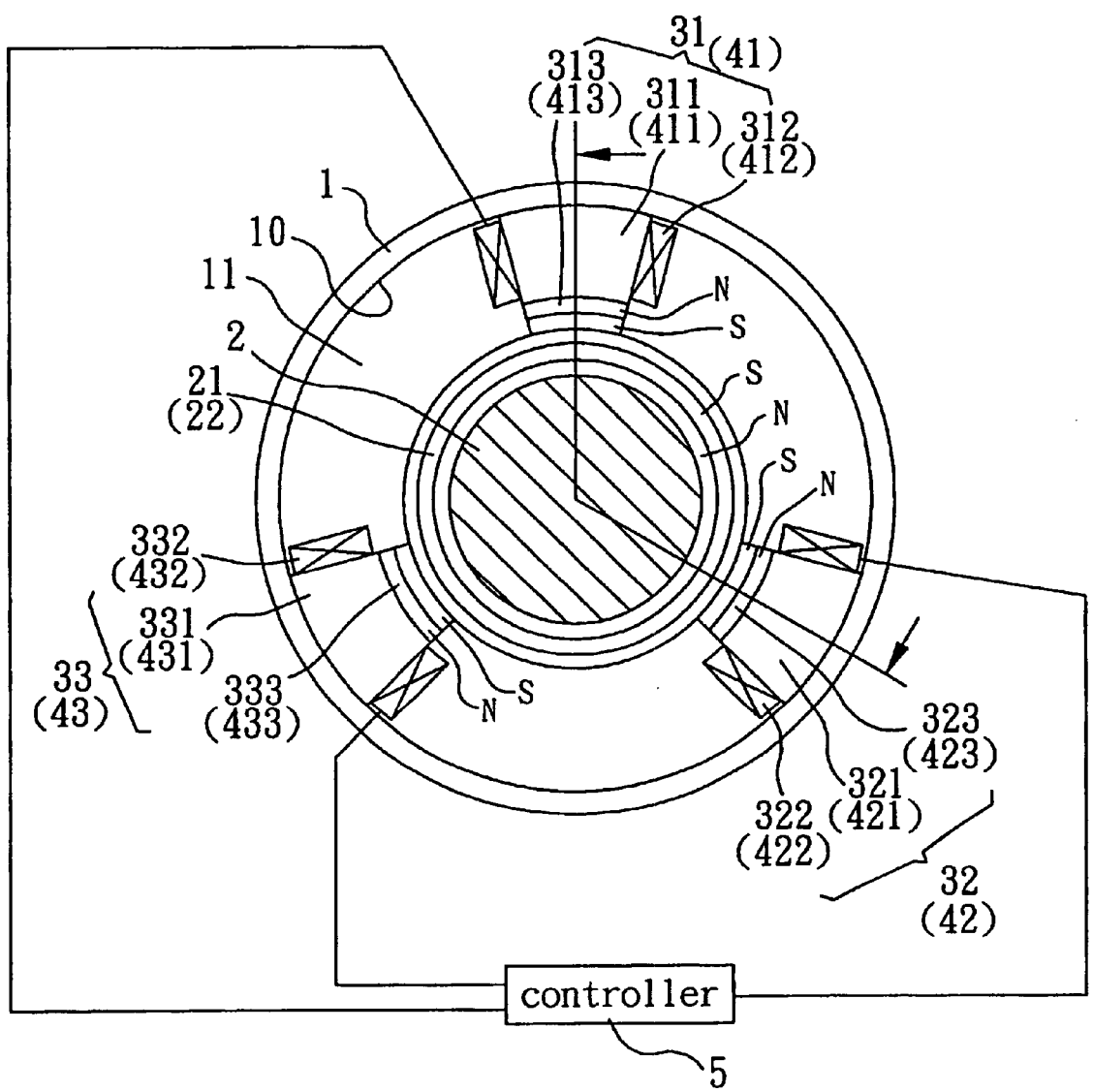
FIG. 1 is a sectional view in axial direction of a magnetic bearing according to the present invention.

Referring to FIG. 1, a magnetic bearing is shown comprising an outer stator 1 and a center rotor 2. The stator 1 has an inside wall 10 defining an axially extended receiving hollow chamber 11. The center rotor 2 is axially received in the receiving hollow chamber 11 inside the stator 1.

Figure 2:
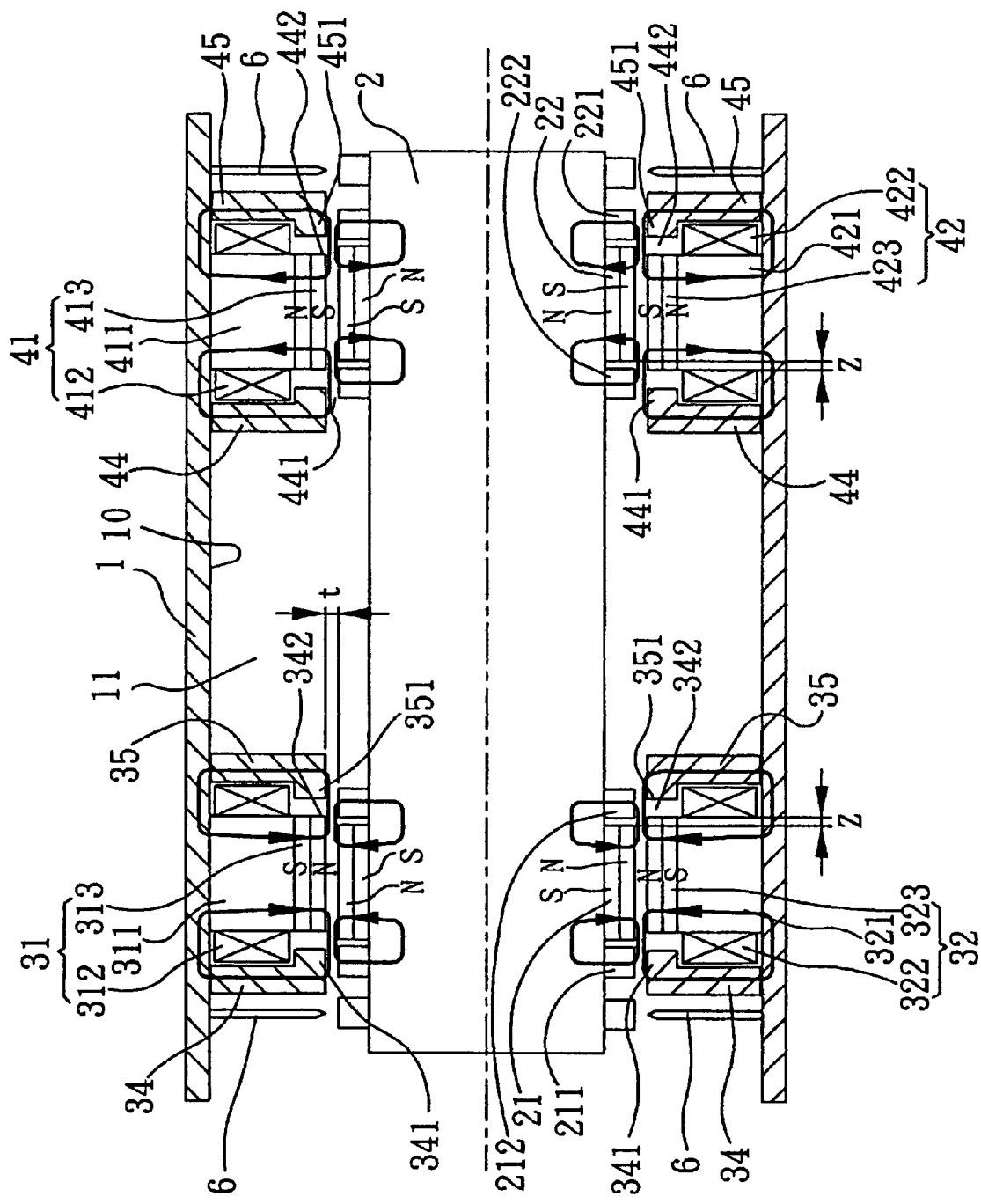
FIG. 2 is a sectional view in radial direction of the magnetic bearing according to the present invention.

Referring to FIG. 2 and FIG. 1 again, two magnetic repulsion modules 3 and 4 are radially arranged around two distal ends of the inside wall 10 of the stator 1. Each magnetic repulsive module 3 or 4 comprises three magnetic repulsion actuators 31, 32, and 33; or 41, 42, and 43 equiangularly spaced arranged around the inside wall 10 of the stator 1 at the pitch of 120°. Two annular permanent magnets 21 and 22 are arranged around the periphery of the two distal ends of the center rotor 2 corresponding respectively to the magnetic repulsion modules 3 and 4. According to this embodiment, the axial distance between the permanent magnets 21 and 22 is slightly greater than the axial distance between the magnetic repulsion modules 3 and 4 showed with symbol Z in FIG. 2. It is also practical to have the axial distance between the magnetic repulsion modules 3 and 4 be slightly greater than the axial distance between the annular permanent magnets 21 and 22.

Figure 3:
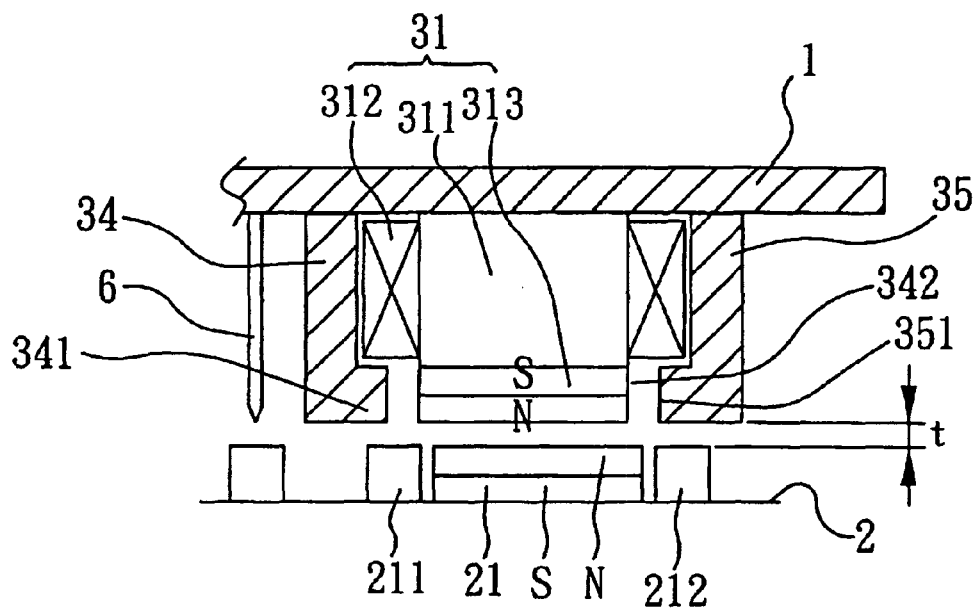
FIG. 3 is an enlarged view of a part of FIG. 2, showing the arrangement of one magnetic repulsion actuator.

FIG. 3 is an enlarged view of a part of FIG. 2, showing the arrangement of one magnetic repulsion actuator 31. The arrangement and principle of the other magnetic repulsion actuators are same as the magnetic repulsion actuator 31. As illustrated in FIG. 3, the magnetic repulsion actuator 31 comprises an iron core 311, a winding 312, and a permanent magnet 313. The iron core 311 has one end radially and fixedly fastened to the inside wall 10 of the stator 1, and the other end fixedly mounted with the permanent magnet 313. The winding 312 is wound around the iron core 311. The permanent magnet 313 is spaced from the annular permanent magnet 21 by a working air gap t. The permanent magnet 313 and the annular permanent magnet 21 have the same polarity, forming a predetermined radial magnetic force of repulsion M. Two annular magnetic paths 211 and 212 are arranged around the periphery of the center rotor 2 and spaced from the annular permanent magnet 21 at two sides by a suitable gap. Please refer also to FIG. 2. The annular permanent magnet 21 and the permanent magnet 313 have same polarity. The annular permanent magnet 22 and the permanent magnet 413 have same polarity. However, the polarity of the annular permanent magnet 21 and the permanent magnet 313 is reversed to the polarity of the annular permanent magnet 22 and the permanent magnet 413, so that the internal flux lines form a magnetic loop.

Referring to FIGS. 2 and 3 again, each magnetic repulsion module 3 or 4 further comprises a pair of annular magnetic poles 34 and 35; 44 and 45. The annular magnetic poles 34 and 35; 44 and 45 each have the respective outside wall fixedly fastened to the inside wall 10 of the stator 1, and a magnetic pole protrusion 341 and 351; 441 and 451 inwardly protruded from the respective inside wall and aimed at the corresponding magnetic repulsion actuator 31, 32, or 33; 41, 42, or 43. The two magnetic pole protrusions 341 and 351; 441 and 451 define an opening 342 or 442 therebetween for receiving the permanent magnet 313 or 413 without contact. Further, a distance sensor 6 is disposed at a suitable location outside the annular magnetic poles 34 and 35; 44 and 45. The distance sensor 6 can be an inductive sensor adapted to measure the displacement of the magnetic repulsion module 3 or 4. When the distance of the working air gap t changed, the system inductance is relatively changed, thereby causing the excited high-frequency magnetic field to be relatively changed. The displacement of the magnetic repulsion module 3 or 4 is measured subject to the change of the excited high-frequency magnetic field. Of course, an eddy current type displacement sensor, capacitance type displacement sensor, laser Doppler effect type displacement sensor, or any of a variety of non-contact type sensors may be used instead of the inductive sensor.

Referring to FIGS. 1–3 again, the invention further comprises a controller 5 electrically connected to the windings 312 . . . , 412 . . . of the magnetic repulsion actuators 31 . . . , 41 . . . . When power failed, a radial magnetic force of repulsion is produced between the permanent magnets 313 . . . , 413 . . . and the corresponding annular permanent magnets 21 and 22 of the center rotor 2. Because the permanent magnets 313 . . . , 413 . . . are arranged at the front ends of the respective iron cores 311 . . . , 413 . . . corresponding to one end of the center rotor 2, the force of repulsion between the permanent magnets 313 . . . , 413 . . . and the annular permanent magnet 21 or 22 is enhanced to keep the center rotor 2 in balance automatically when power failed. Therefore, the center rotor 2 is maintained floating stably when current is turned off. On the contrary, when current is turned on, the controller 5 controls the windings 312 . . . , 412 . . . of the equiangularly spaced magnetic repulsion actuators 31 . . . , 41 . . . to increase or reduce the magnetic force of the corresponding iron cores 311 . . . , 411 . . . respectively, so as to change the radial magnetic force of repulsion M of the respective magnetic repulsion actuators 31 . . . , 41 . . . . Therefore, when the center rotor 2 radially biased toward one side, the aforesaid distance sensor detects the variation of the working air gap t between the permanent magnets 313 . . . , 413 . . . . Based on the detection result of the distance sensor, the controller 5 adds current to the windings 312, 412 of the corresponding magnetic repulsion actuators 31, 41, increasing the radial magnetic force of repulsion of the magnetic repulsion actuators 31,41. At the same time, the controller 5 reduces current from the windings 322, 422 of the magnetic repulsion actuators 32, 42 at the opposite side, reducing the radial magnetic force of repulsion of the corresponding magnetic repulsion actuators 31,41. By means of increasing the magnetic force of repulsion at one side and reducing the magnetic force of repulsion at the opposite side, the position of the center rotor 2 is maintained stable, and therefore, the center rotor 2 is maintained in stiffness in radial direction during rotation. Further, because magnets are provided at the ends of the magnetic bearing, the controller 5 can control the magnetic force of the magnets to keep the center rotor 2 in position when the center rotor 2 is tilted. In general, this embodiment supports the center rotor 2 in balance when the center rotor 2 biased radially toward one side or tilted, achieving position and posture control on the center rotor 2.

According to this embodiment, a by-pass loop is produced between the annular magnetic poles 34 and 35; 44 and 45 and the permanent magnets 313 . . . ; 413 . . . . This by-pass loop causes a change of the distribution of flux lines of the magnetic repulsion actuators 31 . . . ; 41 . . . at the fringe area of the polarity. As illustrated in FIG. 2, the flux lines are controlled to form an integral loop to increase current efficiency and bearing stiffness. Further, because two annular magnetic paths 211 and 212; 221 and 222 are arranged around the center rotor 2 and spaced from the annular permanent magnet 21 or 22 at two sides by a gap, a by-pass loop is produced to achieve the same effect as the by-pass loop between the annular magnetic poles 34 and 35; 44 and 45 and the permanent magnets 313 . . . ; 413 . . . .

As indicated above, the magnetic bearing comprises two annular permanent magnets 21 and 22 and two magnetic repulsion modules 3 and 4 axially disposed at the ends of the center rotor 2 and the outer stator 1; the annular permanent magnets 21 and 22 are reversed in polarity, and the axial distance between the annular permanent magnets 21 and 22 slightly greater than the axial distance between the two magnetic repulsion modules 3 and 4 (see the axial offset arrangement at distance Z in FIG. 2). The axial offset arrangement of the magnetic repulsion modules 3 and 4 and the annular permanent magnets 21 and 22 achieves balancing in axial direction, i.e., a magnetic force of repulsion is produced at one side to push the center rotor 2 in one direction, and a magnetic force of repulsion is produced at the other side to push the center rotor 2 in the reversed direction, keeping the center rotor 2 in stiffness in axial direction. Same effect can be achieved when the axial distance between the annular permanent magnets 21 and 22 shorter than the axial distance between the magnetic repulsion modules 3 and 4.

Figure 4:
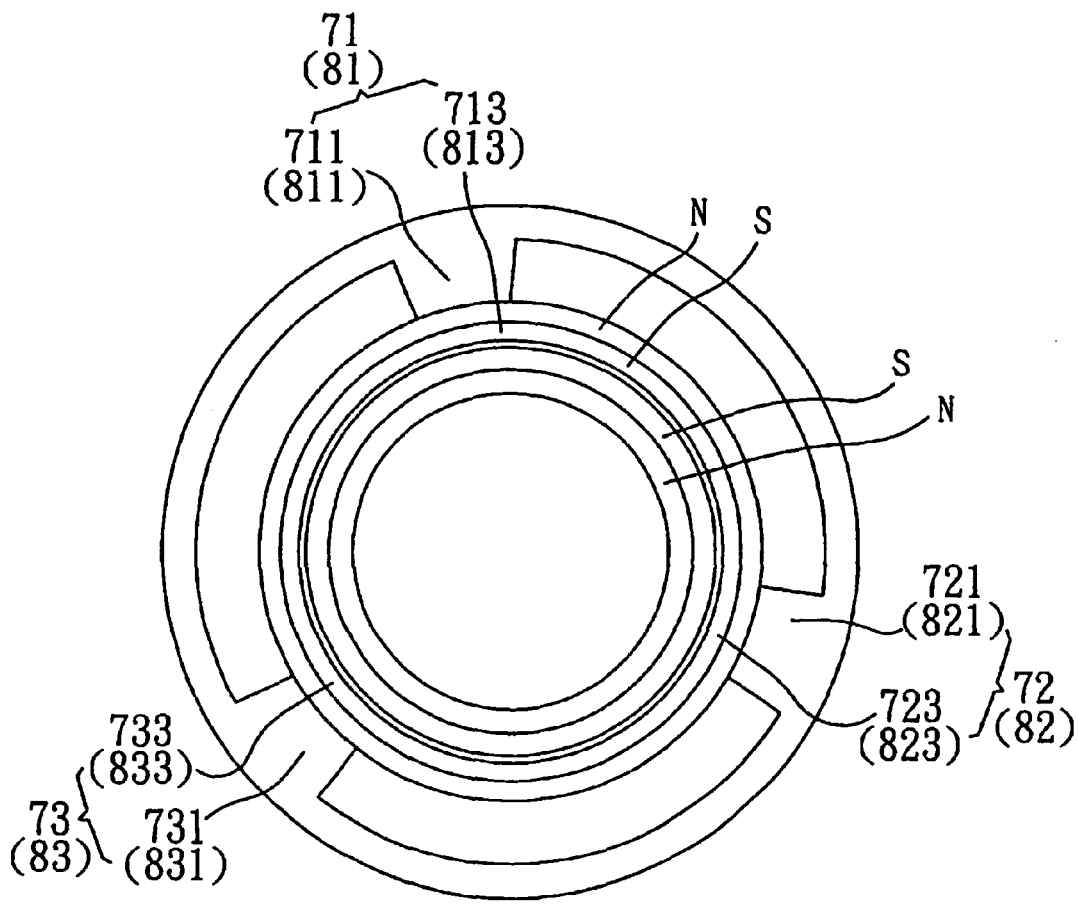
FIG. 4 is a sectional view in axial direction of an alternate form of the magnetic bearing according to the present invention.

FIG. 4 shows an alternate form of the present invention. This alternate form is substantially similar to the aforesaid embodiment with the exception that the permanent magnets 713 . . . , 813 of the magnetic actuators 71 . . . , 81 . . . are integrated into a respective annular member and then fixedly fastened to the respective iron cores 711 . . . , 811 . . . .

Although the present invention has been explained in relation to its preferred embodiments, it is to be understood that many other possible modifications and variations can be made without departing from the spirit and scope of the invention as hereinafter claimed.

What is claimed is:

1. A magnetic bearing comprising:

a stator, said stator having an inside wall defining an axially extended receiving hollow chamber;

at least two magnetic repulsion modules, said magnetic repulsion modules each comprising a plurality of magnetic repulsion actuators equiangularly arranged on the inside wall of said stator, said magnetic repulsion actuators each comprising an iron core having a first end fixedly fastened to the inside wall of said stator and a second end radially extended to the receiving hollow chamber, a permanent magnet located on the second end of said iron core, and a winding wound around said iron core and adapted to produce a magnetic force when electrically connected;

a rotor axially received in the receiving hollow chamber of said stator, said rotor comprising at least two annular permanent magnets arranged around the periphery thereof corresponding respectively to said at least two magnetic repulsion modules, each annular permanent magnet of said rotor defining with the permanent magnet of the magnetic repulsion actuator of the corresponding magnetic repulsion module a working air gap, the polarity of each annular permanent magnet being same as the polarity of the permanent magnet of the magnetic repulsion actuator of the corresponding magnetic repulsion module so that a radial magnetic force of repulsion is produced between each annular permanent magnet of said rotor and the permanent magnet of the magnetic repulsion actuator of the corresponding magnetic repulsion module; and a controller electrically connected to the windings of said at least two magnetic repulsion modules and adapted to respectively control the current of the windings to change the intensity of magnetic force of said at least two magnetic repulsion modules so as to change the net radial magnetic force of repulsion between the annular permanent magnet of the rotor and the permanent magnet of the magnetic repulsion actuator of the corresponding magnetic repulsion module respectively.

2. The magnetic bearing as claimed in claim 1, wherein said at least two magnetic repulsion modules each further comprise a pair of annular magnetic poles located at two sides axially, said pair of annular magnetic poles each having an outside wall fixedly fastened to the inside wall of said stator, and at least one magnetic pole protrusion inwardly protruded from an inside wall of the annular magnetic pole and aimed at the respective permanent magnet of the corresponding magnetic repulsion actuator, the opposite magnetic pole protrusions of the pair of annular magnetic poles defining an opening therebetween for receiving the respective permanent magnet of the corresponding magnetic repulsion actuator without contact.

3. The magnetic bearing as claimed in claim 1, wherein the number of the at least two annular permanent magnets of said rotor is two, and the two annular permanent magnets of said rotor are axially spaced at two ends of said rotor; the number of said at least two magnetic repulsion modules is two, and the two magnetic repulsion modules are axially spaced in the inside wall of said stator corresponding respectively to the two annular permanent magnets of said rotor.

4. The magnetic bearing as claimed in claim 3, wherein the two annular permanent magnets of said rotor are reversed in polarity.

5. The magnetic bearing as claimed in claim 3, wherein the axial distance between the two annular permanent magnets of said rotor is greater than the axial distance between said two magnetic repulsion modules.

6. The magnetic bearing as claimed in claim 1, wherein the permanent magnets of the magnetic repulsion actuators of each of said at least two magnetic repulsion modules are integrated into a respective annular member and then fixedly fastened to the iron cores of the magnetic repulsion actuators of each of said at least two magnetic repulsion modules.

7. The magnetic bearing as claimed in claim 1 further comprising at least one distance sensor electrically connected to said controller and adapted to detect variation of said working air gap for enabling said controller to respectively control the current of the winding to change the intensity of magnetic force of each magnetic repulsion actuator of said at least two magnetic repulsion modules subject to the variation of said working air gap.

8. The magnetic bearing as claimed in claim 7, wherein said distance sensor is an inductive sensor.

9. The magnetic bearing as claimed in claim 1, wherein said at least two annular permanent magnets of said rotor each further comprising a pair of annular magnetic paths arranged around the periphery of said rotor and spaced from the corresponding annular permanent magnet of said rotor at two sides axially by a gap.

* * * * *